Dec. 20, 1960 R. MOORE 2,965,081
AUTOMOBILE AUTOMATIC SPARK ADVANCING MEANS
Filed Sept. 24, 1958 2 Sheets-Sheet 1
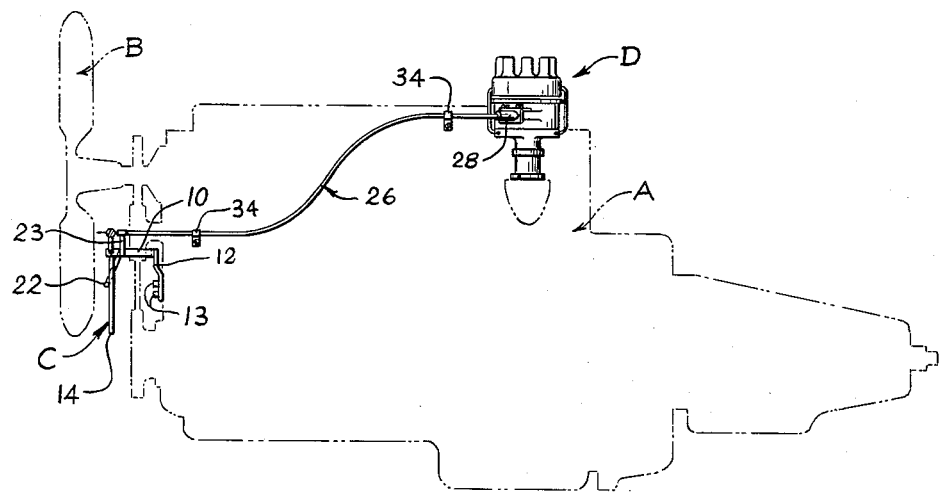
FIG. 1.
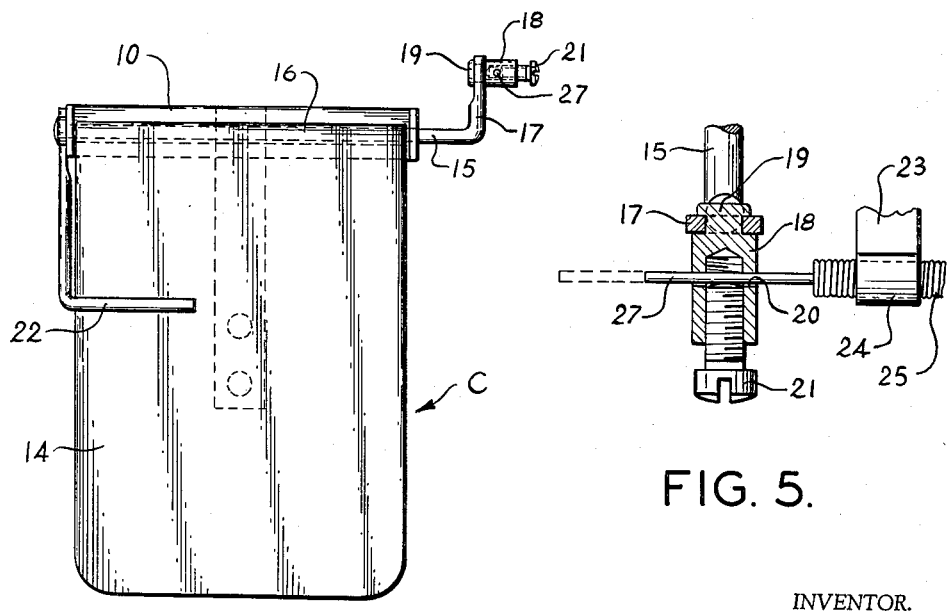
FIG. 2. FIG. 5.
INVENTOR.
RECTOR MOORE
BY
ATTY Dec. 20, 1960 R. MOORE 2,965,081
AUTOMOBILE AUTOMATIC SPARK ADVANCING MEANS
Filed Sept. 24, 1958 2 Sheets-Sheet 2

INVENTOR.
RECTOR MOORE
BY

United States Patent Office 2,965,081
Patented Dec. 20, 1960

2,965,081

AUTOMOBILE AUTOMATIC SPARK ADVANCING MEANS

Rector Moore, St. Louis, Mo., assignor to Bender Motor Co., St. Louis, Mo., a corporation of Missouri Filed Sept. 24, 1958, Ser. No. 763,119

6 Claims. (Cl. 123—117)

Gasoline and similar internal combustion engines for example such as those employed in automobiles, trucks and the like are required to operate at a wide variety of speed and load conditions. The basic principal of operation of internal combustion engines of this type is the introduction of an air-fuel mixture into a cylinder enclosing a piston and the ignition of the mixture by means of a spark supplied by a spark plug.

For maximum efficiency, all of the air-fuel mixture should be burned while the piston is at top dead center. Since combustion requires an appreciable period of time, the spark should be timed to distribute the combustion process somewhat before and after top dead center in order to obtain maximum power. The amount of spark advance depends on several variables such as air-fuel mixture, combustion-chamber design, turbulence, engine speed, number of spark plugs and spark plug location.

At low speeds, engines often require from 10 degrees to 20 degrees crank shaft travel spark advance and at higher speeds, an advance of from 30 degrees to 40 degrees or more may be necessary.

Spark advance and retard in automotive engines is most often controlled automatically by variations in manifold vacuum. In general, the manifold vacuum variations, which are inherent in internal combustion engines of this type, act upon a diaphragm which is linked to an electrical distributor device. In this manner, by well known mechanical means, the time at which the spark occurs with respect to the piston travel may be varied.

My invention appertains to means and apparatus for advancing and/or retarding the timing of the spark in internal combustion engines embodying the use of wind velocity variations.

Gasoline and similar internal combustion engines employ a cooling fan connected so that its speed varies substantially directly with the speed of the engine. Also in automotive installations the forward speed of the automobile contributes to the velocity of the air movement initiated by the fan. It is an object of my invention to provide a means sensitive to changes in air velocity, which in turn are operably connected to an electrical distributing device of well known design to advance or retard the spark timing.

In the accompanying drawings which form a part of this specification,

Figure 1 is a schematic elevation of an internal combustion engine showing a preferred embodiment of my invention;

Figure 2 is an enlarged view of an air velocity sensing means;

Figure 5 is a sectional view through lines 5—5 of Figure 3.

Figure 3:
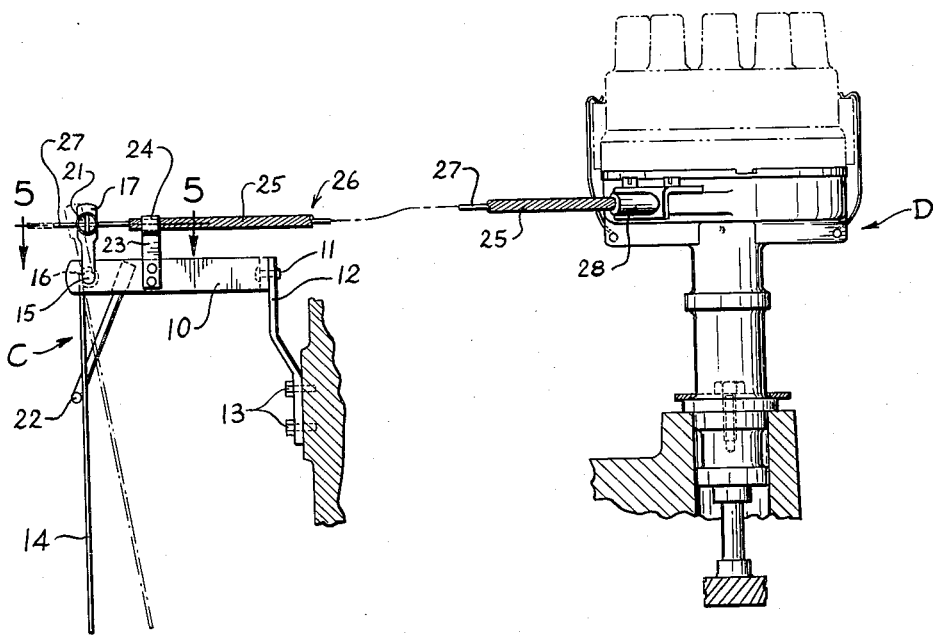
Figure 3 is an enlarged view of the air velocity sensing means shown in Figure 2 illustrating connecting means to an electrical distributing device.

The embodiment of the invention illustrated in Figure 1 is shown attached to an automotive internal combustion engine A provided with a fan device B. An air velocity sensing device C is preferably attached to the engine A at a location closely adjacent the fan B. The air velocity sensing device C is operably connected to an electrical distributor device D of generally standard design and construction.

In detail, in a preferred embodiment of the invention, the veloc ty sensing device C shown in Figures 1, 2, 3 and 4 comprises a hanger bracket 10 generally U shaped in configuration and fixed by rivets 11 to a mounting bracket 12 which in turn is affixed to the engine A at a suitable positon adjacent the output side of the fan B by means of threaded fastenings 13 or any other suitable fastening means such as rivets, welds or the like.

A flat plate or vane 14 is pivotally mounted to the hanger bracket 10 by any suitable means, for example such as shown comprising pivot shaft 15 which is rotatable about a fixed generally horizontal axis. In the embodiment illustrated the vane 14 is fixed with respect to the pivot shaft 15 by means of a curved, encircling upper portion 16, however the vane 14 could be fixed to the shaft 15 by any other suitable means such as by welding and so forth.

Figure 4:
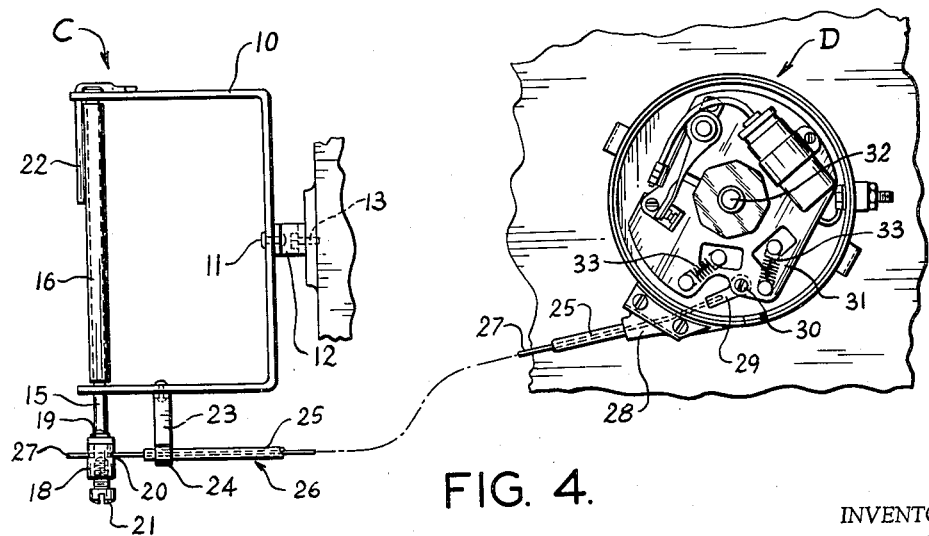
Figure 4 is a top view of the apparatus shown in Figure 3.

As shown most clearly in Figures 2 and 4, the pivot shaft 15 is provided with an extension on one side 17, disposed in generally right angular relation to the pivot shaft. The extension member 17 is provided with tubular cylinder 18 affixed thereto by a rivet 19 or other suitable means. The cylinder device 18 is provided with a suitable opening 20 adapted to receive a flexible shaft part described hereinafter. The opening 20 is preferably aligned in a plane substantially normal to the plane enclosing the vane 14. A threaded set screw 21 is operably receivable into the threaded cylinder 18.

A limit bar 22 is fixed to the hanger bracket 10 and is provided with a vane contacting portion positioned between the fan and the air velocity sensing device C. The function of the limit bar 22 will be apparent from the further description of the device. A shaft holding bracket 23 is fixedly secured to the hanger by any suitable means. The bracket 23 is provided with a circular top portion 24 to fixedly hold the casing 25 of a flexible shaft 26 of a well known design.

The flexible shaft device 26 is in turn provided with an interior movable shaft wire 27 one end of which extends through the opening 20 of the cylinder 18 and is fixedly secured thereto by means of the set screw device 21. The flexible shaft 26 is of such a length as to permit it to extend to the distributor D, which in turn is provided with a shaft receiving portion 28 having means to fixedly receive one end of the flexible shaft casing 25.

One end of the shaft wire 27 extends to the distributor D and is provided with a mounting lug 29 fixedly secured thereto. The lug 29 is in turn, pivotally fixed by means of a screw 30 to a spark advance-retard plate 31 of generally customary design. The plate 31 is rotatably mounted about a vertical axis 32 and is provided with springs 33 to return the plate 31 to a predetermined position in the absence of any force exerted by the shaft wire 27.

As shown in Figure 1, a mounting clip 34 may be provided to further immobilize the length of the flexible shaft 26.

In operation, the device is adjusted so that the vane 14 is substantially in a vertical position against the limit bar 22, as shown in Figures 1 and 3. The device may be adjusted to this preferred position by adjustment of the shaft wire 27 within the cylinder device 18 where it is fixedly secured by the set screw 21. Figure 5 illustrates an enlarged view of the adjustment feature.

As the engine A is operated at increasingly faster speeds, the fan B also rotates proportionately faster. Accordingly the velocity of the air discharged by the fan increases. The increasing air pressure then forces the vane 14 rearward or away from the fan as shown in the dashed line portion illustrated in Figure 3. The rearward movement of the vane will cause the pivot shaft 15 and shaft extension 17 to rotate in a counter-clockwise direction which in turn causes the cylinder 18 and the connected shaft, wire 27 to move forward. The forward movement of the shaft wire 27 causes the mounting lug 29 to also move forward which in turn causes the spark advance-retard plate 31 to rotate in an advance or clockwise direction (Figure 4). The movement of the plate 31 in this manner, advances the timing of the spark impulse within the distributor in a well known manner, since the distributor is of a commercial design.

Conversely, as the speed of the engine and fan decrease, the air velocity (pressure) is decreased and the vane 14 will automatically commence to return to the vertical equilibrium position, with an attendant movement of the plate 31 in a counter clockwise position retarding the timing of the spark impulse. The spring devices 33 customarily provided in distributor devices affords the motive force to return the plate 31, the shaft wire 27, and the vane 14 to the vertical or equilibrium position.

When my device is employed with automotive engines, the wind velocity of the forward motion of the vehicle supplements to the air velocity initiated by the fan 14. This phenomenon has been found in practice to have no adverse effect upon the operation of the device, since the air movement afforded by the forward movement of the vehicle is not substantial until relatively high forward speeds are attained. At these relatively high speeds the high rotative speed of the engine A and the fan B, have preferably actuated the vane 14 a maximum rearward position of greatest advance for the spark timing.

The amount of greatest advance (rearward position of the vane 14 and the shaft wire 27) is, in the embodiment of the invention illustrated determining by the size and spring constant of the springs 33. In practice I have found it unnecessary to change or modify the springs 33 found in ordinary commercial distributor devices. However the operation of my device could be conveniently varied, if desired, by substantially relatively stronger or weaker springs 33. Of course, external springs or damping devices (not shown) could be added to the vane 14 or extension 17 or other movable parts of the device if desired for the proposes of obtaining particular results.

In a preferred embodiment of the device, I have found that a vane 14 of 4 inches by 6 inches provided satisfactory operation. Of course the size of the vane 14 could be varied if desired. Also, I have illustrated a vane of generally rectangular configuration however the shape may be varied to any convenient outline and still full within the limits of my invention.

While a preferred embodiment of the invention has been described in detail, various modifications may be employed to provide various other forms of the invention which fall within the spirit and scope of my invention.

For example other forms of air velocity sensing elements may be utilized. A shutter type vane in which the vanes are openably connected to spark advance-retard means may be employed.

Also, it may be desirable in certain installations to provide a mechanical pivot arm linkage or other means between the air velocity sensing means and the spark advance retard means.

These and other like embodiments fall within the spirit and scope of the claims next appearing.

What I claim as my invention is:

1. In an internal combustion engine having at least one cylinder with a piston operable therein and having a spark generating means for igniting a fuel charge within said cylinder, a fan device operable at speeds generally proportional to the rotative speed of said engine, an electric impulse distributor device connected with said spark generating means and having a movable, adjustable timing part for advancing or retarding the electric impulse to the spark generating means; a spark timing control means comprising an air velocity sensing vane means disposed generally within the discharge of said fan, a substantially U-shaped vane supporting bracket having a base portion thereof fixed to said engine and with the arms thereof extending horizontally outwardly therefrom, a rotatable shaft mounted in the outer ends of the said bracket, an upper end portion of the vane means being fixed to said shaft and movable therewith within the bracket, said air velocity sensing means having a movable part operable in a direction away from the fan by the fan discharge, said movable part being connected with said adjustable timing part to advance or retard the timing of electrical spark impulse in a manner generally proportional to the speed of the engine, and a tension means operable with air velocity sensing movable part to return said movable part to a predetermined neutral position at relatively low speeds of said fan.

2. In an automotive gasoline internal combustion engine having an electrical distributor with a movable, rotatable spark impulse timing part, one or more spark plugs and a cooling fan; means for controlling said timing part, said means comprising a relatively flat plate disposed within the air air discharge of said fan and hinged about a horizontal axis, so that increasing fan discharge velocities swing said plate upwardly away from said fan, mechanical means operably connected between said flat plate and said timing part for advancing or, retarding the spark impulse, and a spring tensioning means connected to said flat plate to return said plate to an equilibrium position at minimum engine speeds.

3. In an automatic control for an electrical circuit, a horizontally mounted vane movably mounted on a substantially U-shaped support, the vane being movable by a stream of air, linkage means connected to the vane, variable electrical impulse timing means operably connected to the linkage means, the movement of the vane affecting movement of the impulse timing means in a manner substantially proportional to the velocity of the air stream.

4. The invention as set forth in and by claim 3 wherein the linkage means comprises a flexible control cable means comprising a shaft movably disposed within a flexible shaft.

5. An accessory attachment for internal combustion engines for controlling the spark advance thereof proportional to engine speed, comprising a U-shaped bracket having a bight portion and a pair of legs projecting therefrom, a mounting bracket rigid with an intermediate portion of said bight portion for mounting the U-shaped bracket on an internal combustion engine with the legs thereof disposed in forwardly extending horizontal position, a pivot shaft extending between and journalled within the forward extremities of said legs, a generally rectangular vane secured along its upper edge to said pivot shaft between said legs and depending normally therefrom so as to be disposed substantially at right angles to said legs, a limit bar fixed to one of said legs and extending downwardly and forwardly therefrom to pass in front of said vane and terminating in a horizontally inwardly directed portion lying in front of said vane below said pivot shaft so as to limit forward motion of said vane, said pivot shaft having an upwardly extending end portion outside the confines of said legs, a flexible cable, means for anchoring said cable to an associated internal combustion engine, means for connecting one end of said cable to said extension of said pivot shaft, means at the opposite ends of said cable for connection to the breaker plate of an internal combustion engine distributor.

6. The assembly as defined in and by claim 5 wherein that end of the cable which is attached to the extension is adjustable relative thereto.

References Cited in the file of this patent

UNITED STATES PATENTS

| | | |
|---|---|---|
| 1,068,097 | Benjamin | July 22, 1913 |
| 2,798,465 | Nicholson | July 9, 1957 |

FOREIGN PATENTS

| | | |
|---|---|---|
| 1,030,895 | France | Mar. 18, 1953 |